United States Patent [19]

Shimozono et al.

[11] Patent Number: 5,304,756
[45] Date of Patent: Apr. 19, 1994

[54] ACCELERATION SENSOR WITH DIAGNOSTIC RESISTOR FOR DETECTING BROKEN CONTACTS

[75] Inventors: Shigeru Shimozono; Kazuo Yoshimura; Ryo Satoh, all of Kanagawa, Japan

[73] Assignee: Takata Corporation, Tokyo, Japan

[21] Appl. No.: 797,341

[22] Filed: Nov. 25, 1991

[30] Foreign Application Priority Data

Dec. 25, 1990 [JP] Japan ................................ 2-405803

[51] Int. Cl.5 .............................................. H01H 35/14
[52] U.S. Cl. .......................... 200/61.45 M; 200/61.53
[58] Field of Search ..................... 200/61.45 M, 61.48, 200/61.53, 61.45 R

[56] References Cited

U.S. PATENT DOCUMENTS

| | | | |
|---|---|---|---|
| 4,221,940 | 9/1980 | Roth | 200/61.45 R |
| 4,827,091 | 5/1989 | Behr | 200/61.45 M |
| 4,906,019 | 3/1990 | Takase et al. | 280/735 |
| 5,053,588 | 10/1991 | Bolender | 200/61.45 R |
| 5,126,515 | 6/1992 | Sugimoto | 200/61.45 R |

FOREIGN PATENT DOCUMENTS 2740342 3/1978 Fed. Rep. of Germany.
1586611 3/1981 United Kingdom.

Primary Examiner—J. R. Scott
Attorney, Agent, or Firm—Kanesaka & Takeuchi

[57] ABSTRACT

An accelerator sensor is formed of a cylinder of a conductive material, a magnetized inertial member mounted in the cylinder so as to be movable longitudinally of the cylinder, a conductive member mounted at least on the end surface of the inertial member that is located on the side of one longitudinal end of the cylinder, a pair of electrodes disposed at this one longitudinal end of the cylinder, and an attracting member disposed near the other longitudinal end of the cylinder wherein each of the electrodes has an end portion communicating to a terminal for a conductive wire and a front end which the conductive member makes contact with. Each electrode has a slit extended from the end portion to the front portion thereof. One side of the electrode divided by the slit is communicated to the terminal, and a resistor is installed between the other sides of the electrodes.

3 Claims, 2 Drawing Sheets

ACCELERATION SENSOR WITH DIAGNOSTIC RESISTOR FOR DETECTING BROKEN CONTACTS

FIELD OF THE INVENTION

The present invention relates to an acceleration sensor and, more particularly, to an acceleration sensor adapted to detect a large change in the speed of a vehicle caused by a collision or the like.

BACKGROUND OF THE INVENTION

An acceleration sensor of this kind is described in U.S. Pat. No. 4,827,091. This known sensor comprises a cylinder made of a conductive material, a magnetized inertial member mounted in the cylinder so as to be movable longitudinally of the cylinder, a conductive member mounted at least on the end surface of the inertial member which is on the side of one longitudinal end of the cylinder, a pair of electrodes disposed at one longitudinal end of the cylinder, and an attracting member disposed near the other longitudinal end of the cylinder. When the conductive member of the magnetized inertial member makes contact with the electrodes, these electrodes are caused to conduct via the conductive member. The attracting member is made of such a magnetic material that the attracting member and the inertial member are magnetically attracted towards each other.

In this acceleration sensor, the magnetized inertial member and the attracting member attract each other. When no or almost no acceleration is applied to the sensor, the inertial member is located at rest at the other end in the cylinder.

If a relatively large acceleration acts on this acceleration sensor, the magnetized inertial member moves against the attracting force of the attracting member. During the movement of the inertial member, an electrical current is induced in this cylinder to produce a magnetic force which biases the inertial member in the direction opposite to the direction of movement of the inertial member. Therefore, the magnetized inertial member is braked, so that the speed of the movement is reduced.

When the acceleration is less than a predetermined magnitude, or threshold value, the magnetized inertial member comes to a stop before it reaches the front end of the cylinder. Then, the inertial member is pulled back by the attracting force of the attracting member.

When the acceleration is greater than the predetermined magnitude, or the threshold value, e.g., the vehicle carrying this acceleration sensor collides with an object, the inertial member arrives at one end of the cylinder. At this time, the conductive layer on the front end surface of the inertial member makes contact with both electrodes to electrically connect them with each other. If a voltage has been previously applied between the electrodes, an electrical current flows when a short circuit occurs between them. This electrical current permits detection of collision of the vehicle.

Heretofore, the electrodes have had continuity via a resistor having high resistance to detect disconnection of a conductor wire between the electrode and a collision detecting circuit. When a voltage is applied to the electrodes, the weak current flows through the resistor. The electrodes and the detecting circuit have continuity so far as the weak current flows. Disconnection of the conductor wire can be detected when the current is cut.

In the acceleration sensor of prior art, the electrodes have continuity via a resistor even if the front portion of the electrode is broken off. Therefore, breaking-off of the front portion of the electrode can not be detected.

OBJECT AND SUMMARY OF THE INVENTION

It is an object of the present invention to provide an acceleration sensor which is capable of detecting the break-off of the front portion of the electrode.

It is another object of the invention to provide a quite reliable acceleration sensor.

The novel acceleration sensor comprises: a cylinder made of a conductive material; a magnetized inertial member mounted in the cylinder so as to be movable longitudinally of the cylinder; a conductive member mounted on the end surface of the inertial member which is on the side of one longitudinal end of the cylinder; a pair of electrodes which are disposed at this one longitudinal end of the cylinder and which, when the conductive member of the inertial member makes contact with the electrodes, are caused to conduct via the conductive member; and an attracting member disposed near the other longitudinal end of the cylinder, and made of a magnetic material which magnetically attracts the inertial member. Each electrode has a front portion which the conductive member of the inertial member may come into contact with and an end portion which is integral with a terminal to which a lead wire from a collision detecting circuit goes. Each extending provided with a slit elongated from the end portion toward the front portion thereof. One half of the electrodes divided by the slit is integral with the terminal.

The other halves of the electrodes have continuity with each other by a resistor.

In this novel acceleration sensor, when the front portion of the electrode is broken off, then the one half and the other half of the electrode divided by the slit are separated apart from each other. Accordingly, a lead wire which goes to the terminal from the collision detecting circuit is disconnected with the resistor when the front portion is broken off. Therefore, the breakage of the front portion of the electrode is detected by detecting a cut-off of the current which flows between the electrodes via the resistor. Of course, when the lead wire is cut off, the current does not flow so that the cut-off of the wire can be detected.

DETAILED DESCRIPTION OF THE INVENTION

Figure 1:
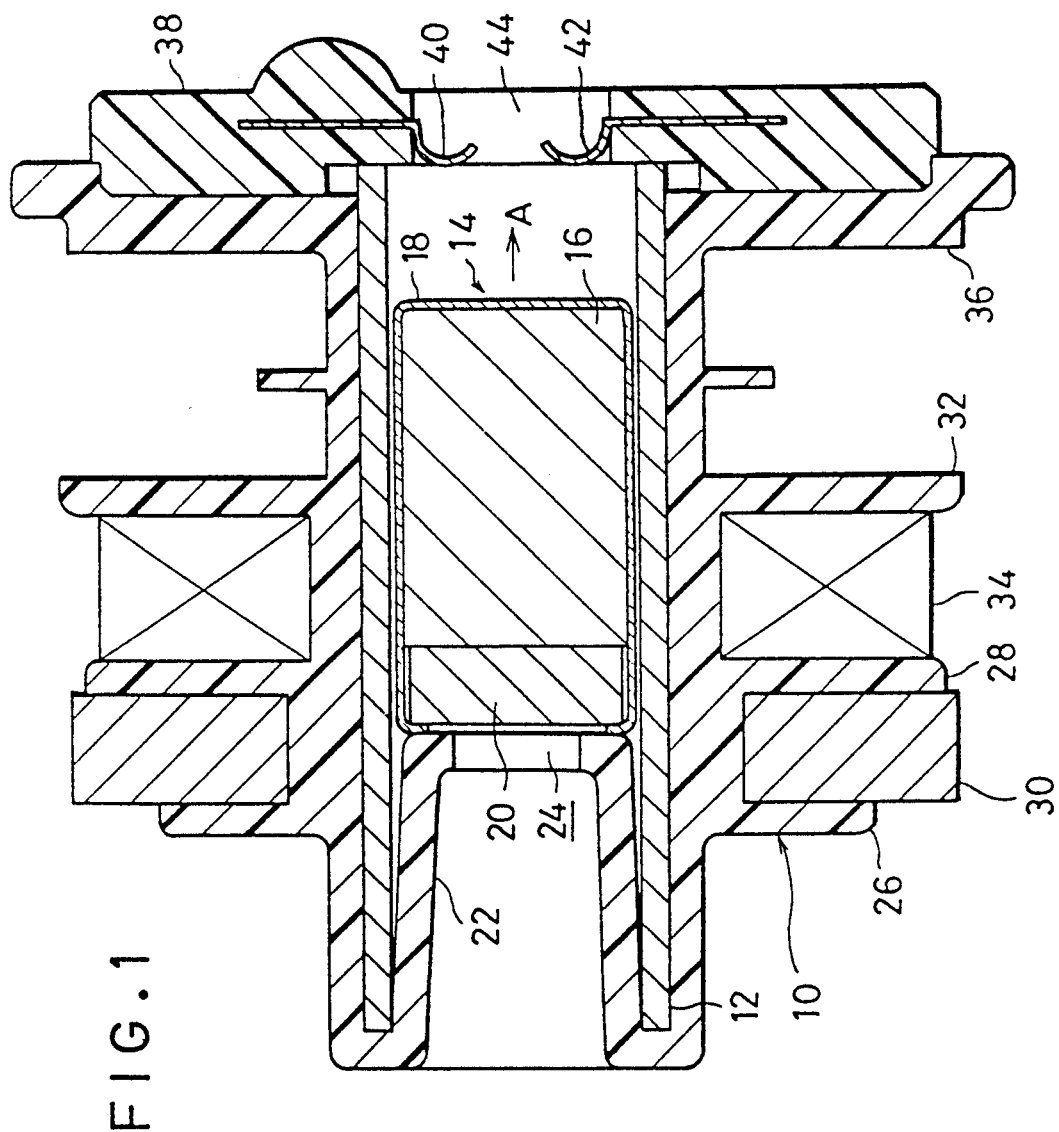
FIG. 1 is a cross-sectional view of an acceleration sensor according to the invention.

Referring to the drawings, there is shown an acceleration sensor according to the invention. This sensor has a cylindrical bobbin 10 made of a nonmagnetic material such as a synthetic resin. A cylinder 12 made of a copper alloy is held inside the bobbin 10. A magnetized inertial member or magnet assembly 14 is mounted in the cylinder 12. This assembly 14 comprises a cylindrical core 16 made of a permanent magnet, a cylindrical case 18 having a bottom at one end, and a packing 20 made of a synthetic resin. The case 18 is made of a nonmagnetic conductive material such as copper and encloses the core 16. The case 18 is opened at the other end thereof. The packing 20 acts to hold the core 16 within the case 18. The magnet assembly 14 is fitted in the cylinder 12 in such a way that it can move longitudinally of the cylinder 12.

The bobbin 10 has an insert portion, 22 at its one end. This insert portion 22 extends into the cylinder 12. An opening 24 is formed at the front end of the insert portion 22. A pair of flanges 26 and 28 protrudes laterally outwardly near the front end of the insert portion 22 of the bobbin 10. An annular attracting member or return washer 30 which is made of a magnetic material such as iron is held between the flanges 26 and 28.

The bobbin 10 has another flange 32. A coil 34 is wound between the flanges 28 and 32. A further flange 36 is formed at the other end of the bobbin 10. A contact holder 38 is mounted to this flange 36.

This contact holder 38 is made of a synthetic resin. A pair of electrodes 40 and 42 is buried in the holder 38. An opening 44 is formed in the center of the holder 38. The front ends of the electrodes 40 and 42 protrude into the opening 44. The electrodes 40 and 42 have arc-shaped front end portions. Parts of the arc-shaped front end portions are substantially flush with the front end surface of the cylinder 12.

Figure 2:
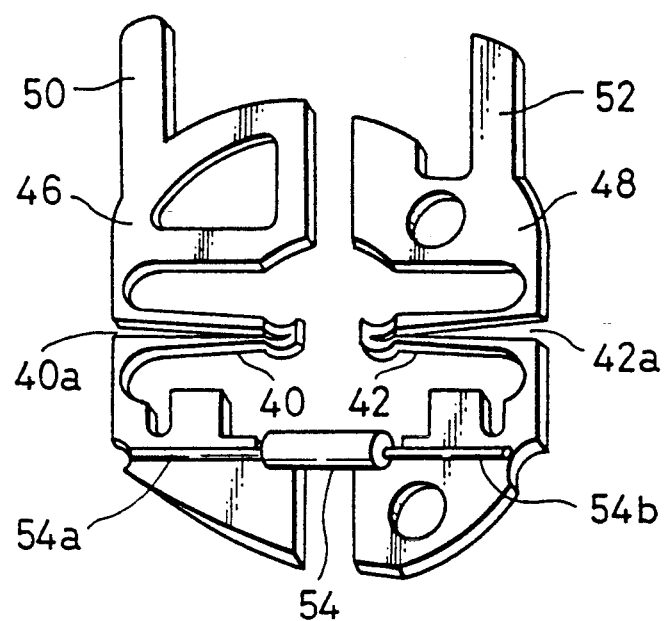
FIG. 2 is a perspective view of electrodes and a resistor.

FIG. 2 is a perspective view of the electrodes 40, 42. Each of the electrodes 40, 42 is formed as a portion of each of conductive pieces 46, 48 made of a thin stamped-out copper plate. The conductive pieces 46, 48 are provided with terminals 50, 52 connected to lead wires (not shown) respectively. Slits 40a, 42a extend from the end portions toward the front portions of the electrodes 40, 42. The electrodes 40, 42 are integral with the terminals 50, 52.

A resistor 54 is installed like a bridge between the pieces 46, 48. Lead terminals 54a, 54b of the resistor 54 are soldered to the pieces 46, 48 respectively.

The conductive pieces 46, 48 integrated by the resistor 54 thus soldered are insert-molded with a synthetic resin, and the contact holder 38 is formed with the pieces 46, 48 and the resistor 54 therein as shown in FIG. 1.

The operation of the acceleration sensor constructed as described thus far is now described. When no external force is applied, the magnet assembly 14 and the return washer 30 attract with each other. Under this condition, the rear end of the magnet assembly 14 is in its rearmost position where it bears against the front end surface of the insert portion 22. If an external force acts in the direction indicated by the arrow A, then the magnet assembly 14 moves in the direction indicated by the arrow A against the attracting force of the return washer 30. This movement induces an electrical current in the cylinder 12 made of a copper alloy, thus producing a magnetic field. This magnetic field applies a magnetic force to the magnet assembly 14 in the direction opposite to the direction of movement. As a result, the assembly 14 is braked Where the external force applied to the acceleration sensor is small, the magnet assembly 14 comes to a stop on its way to one end of the cylinder 12. The magnet assembly 14 will soon be returned to its rearmost position shown in FIG. 1 by the attracting force acting between the return washer 30 and the magnet assembly 14.

If a large external force is applied in the direction indicated by the arrow A when the vehicle collides, then the magnet assembly 14 is advanced up to the front end of the cylinder 12 and comes into contact with the electrodes 40 and 42. At this time, the case 18 of the magnet assembly 14 which is made of a conductive material creates a short-circuit between the electrodes 40 and 42, thus producing an electrical current between them. This permits detection of an acceleration change greater than the intended threshold value. Consequently, the collision of the vehicle is detected A weak current flows between the terminals 50, 52 of the pieces 46, 48 via the resistor 54.

Figure 3:
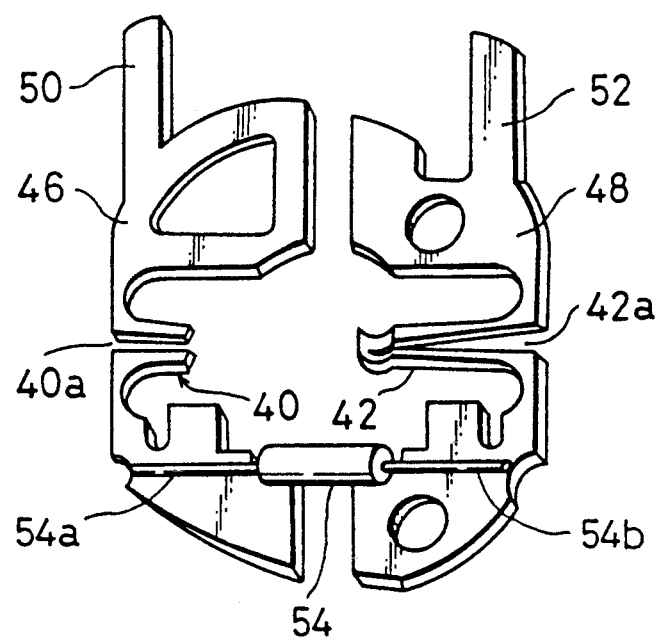
FIG. 3 is a perspective view of electrodes which is broken off the front portion.

In this embodiment, the weak current between the terminals 50, 52 is cut off when the front portion of the electrode 40 is broken off into two parts separated each other by the slit 40a as shown in FIG. 3. Accordingly, breakage of the front portion of the electrode 40 can be detected. Breakage of the front portion of the electrode 42 can be detected in the same manner as above.

The aforementioned coil 34 is used to check the operation of the acceleration sensor. In particular, when the coil 34 is electrically energized, it produces a magnetic field which biases the magnet assembly 14 in the direction indicated by the arrow A. The magnet assembly 14 then advances up to the front end of the cylinder 12, short-circuiting the electrodes 40 and 42. In this way, the coil 34 is energized to urge the magnet assembly 14 to move. Thus, it is possible to make a check to see if the magnet assembly 14 can move back and forth without trouble and if the electrodes 40 and 42 can be short-circuited.

In this embodiment, a cut-off of the conductive wire between the pieces 46, 48 and the detecting circuit can be detected, since the lead terminals 54a, 54b are connected to the pieces 46, 48 as shown in figures. The pieces 46, 48 and the resistor 54 are protected since main portions of the pieces 46, 48 and the resistor 54 are buried in the synthetic resin of the contact holder 38. Accordingly, deformation or breakage of the pieces 46, 48 and the resistor 54 are prevented during assembly of the sensor since a hand of an assembler or a tool is prevented to come into contact with them.

What is claimed is:

1. An acceleration sensor comprising:
   a cylinder made of a conductive material;
   a magnetized inertial member mounted in the cylinder so as to be movable longitudinally of the cylinder;
   a conductive member mounted on at least one end surface of the magnetized inertial member which is located on a side of one longitudinal end of the cylinder;
   a pair of first and second electrodes which are disposed at said one longitudinal end of the cylinder and which, when the conductive member of the magnetized inertial member makes contact with the electrodes, are caused to conduct via the conductive member; and
   an attracting member disposed near the other longitudinal end of the cylinder and made of a magnetic material, the attracting member magnetically attracting the inertial member;
   each of said first and second electrodes having an end portion communicating to a terminal connected to a conductive wire and a front portion which said conductive member make contact with;

each of said first and second electrodes being provided with a slit extending from said end portion toward said front portion, wherein one half of each electrode divided by the slit is integral with said terminal, said sensor further comprises a resistor through which the other halves of the electrodes are electrically connected together, said resistor having enough high resistance to allow weak current to flow therethrough so that breakage of the front portion of said electrode can be detected by detecting cut-off of said weak current.

2. The acceleration sensor of claim 1, wherein each of said electrodes is one part of a conductive piece made of a stamped-out plate, and the electrode is elongated.

3. The acceleration sensor of claim 2, wherein said resistor and said conductive piece excluding said electrodes and terminals are inserted in a synthetic resin.

* * * * *